(No Model.)

S. SPITZER.
FLOUR PURIFIER.

No. 329,498. Patented Nov. 3, 1885.

Witnesses:
Louis Beyer
T. C. Brecht

Inventor:
Sigmund Spitzer,
By T. C. Brecht,
Attorney.

UNITED STATES PATENT OFFICE.

SIGMUND SPITZER, OF VIENNA, AUSTRIA-HUNGARY.

FLOUR-PURIFIER.

SPECIFICATION forming part of Letters Patent No. 329,498, dated November 3, 1885.

Application filed July 25, 1885. Serial No. 172,644. (No model.)

*To all whom it may concern:*

Be it known that I, SIGMUND SPITZER, a subject of the Emperor of Austria-Hungary, residing at Vienna, in the Empire of Austria-Hungary, have invented certain new and useful Improvements in Flour-Purifiers; and I do hereby declare the following to be a full, clear, and exact description of the invention, such as will enable others skilled in the art to which it appertains to make and use the same.

My invention relates to improvements in flour-purifiers; and the object of my invention is to provide a machine by which the specks and all deleterious matter tending to make an inferior quality of flour can be removed, whereby the quality of the flour is greatly improved; and, further, to perform this operation in a very simple and reliable manner and at a comparatively small expense, and to exhaust the fine materials held in suspension and separate them from the particles of grain.

The invention consists in the construction and arrangement of parts, which will be fully described hereinafter, and specifically pointed out in the claims, reference being had to the accompanying drawings, and the letters of reference marked thereon.

Figure 1:
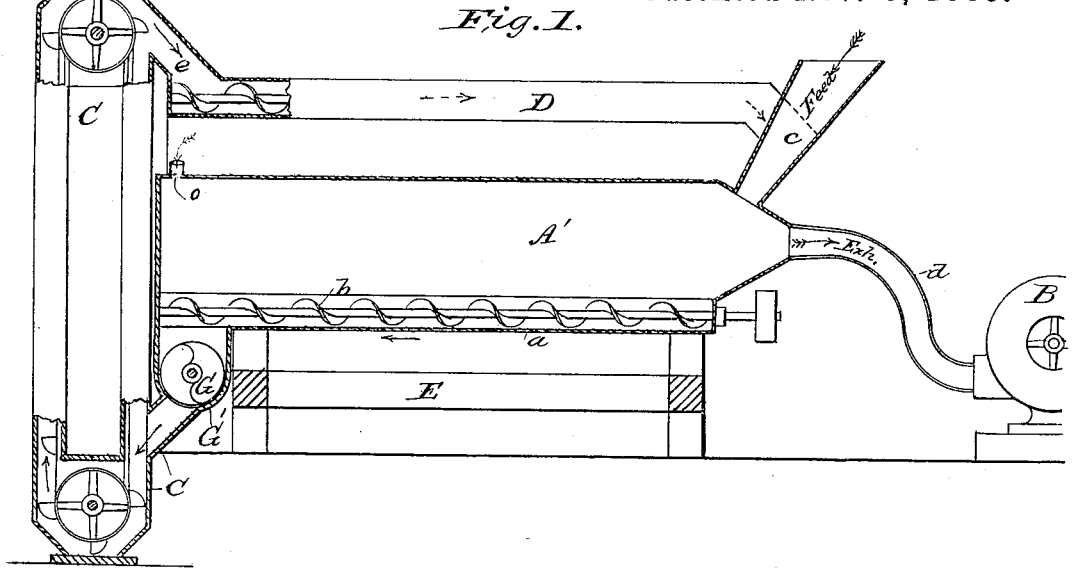
Figure 2:
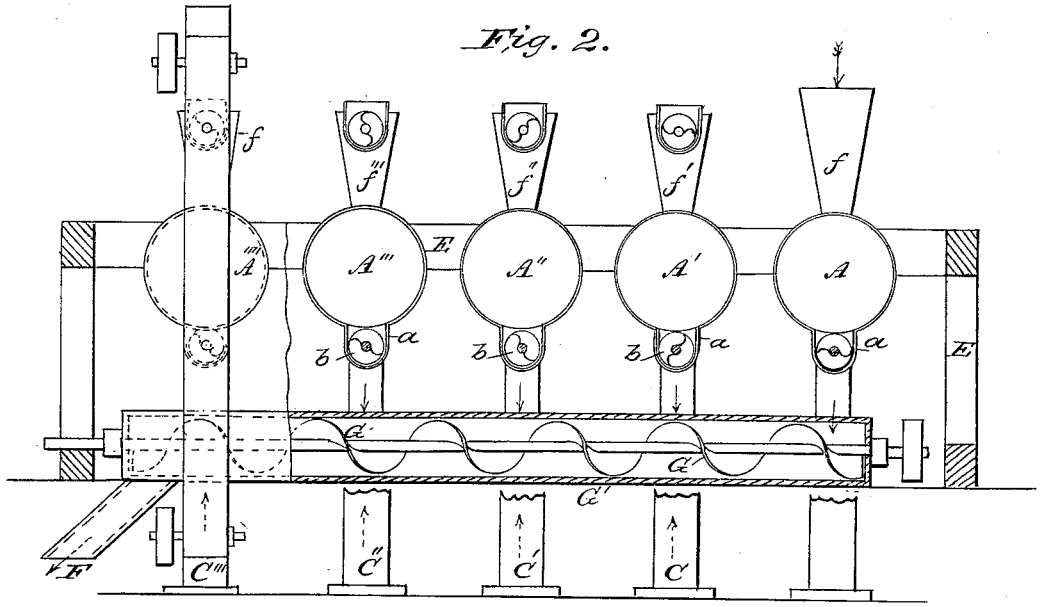

The same letters indicate the same parts in the different figures of the drawings, in which Figure 1 represents a longitudinal vertical section of one of the cylinders in my improved machine. Fig. 2 is a cross-section, partly in elevation, of the same.

In said drawings, A A' A'' A''' A'''' represent a series of cylindrical receptacles having at their lower sides semicircular extensions $a$ for the reception of the conveyers $b$, receiving motion from any suitable pulley or gearing, so as to rotate rapidly. The material is introduced through the feed-spout $c$, and carried by the conveyers toward the opposite ends of the cylinders, and in its course is continuously agitated and thrown upward by the conveyers $b$. During its passage air is admitted through openings or tubes $o$ at the rear ends of the cylinders, and the fine bran, dust, &c., held in suspension by the air are exhausted from the feed ends of said cylinders by the exhaust-fans B, connected thereto by the pipes $d$, so that the air-currents and the material traverse the cylinder in opposite directions. After the material has been conveyed to the end of the first cylinder by a conveyer, $b$, it drops through a spout into an elevator, C, from which it is carried by a spout, $e$, into a conveyer-receptacle, D, in which it is conveyed to a second feed-spout, $f'$, and cylinder A', and so in succession to each cylinder until the entire series has been passed through and the material has been thoroughly cleaned and purified. The material is carried from one cylinder to the next elevator by a transverse conveyer, G, in the trough G', which has an opening or spout opposite each one of the elevators. Any moisture or vapors arising out of the coarse flour will be extracted or withdrawn by means of the exhaust-fans until a perfectly white and superior quality of flour is produced without any specks or other objectionable matters.

A suitable frame-work or casing, E, is arranged to support or incase the entire machine, and any suitable arrangement of gearing or belts and pulleys may be employed to impart motion to the different conveyers, elevators, or fans to suit circumstances and as desired. The dimensions of the different parts of the machine may also be changed as found most serviceable. The elevators to be employed with all excepting the last cylinder are shown as broken away in Fig. 2, although they should be arranged as shown at cylinder A''''. After the material has been thoroughly purified it is withdrawn through the outlet-spout F from the trough G' at the end nearest the last elevator, and can be conveyed wherever it is desired.

If desired, a greater or smaller number of cylinders, conveyers, &c., may be employed, and instead of having a separate fan for each cylinder one fan might be employed provided with a series of branch pipes leading to the different cylinders, and suitable valves for regulating the air-currents.

Having thus described my invention, what I claim, and desire to secure by Letters Patent, is—

1. The horizontal hollow cylinder formed at one end with openings for the egress of the air and the supply of the material, at the other end with openings for the ingress of the air and the discharge of the material, and on its under side with an extension or trough, in combination with a suction-fan and a longitudinal spiral conveyer and agitator located in said trough, whereby the material to be purified is conveyed in one direction while the air-current passes in the other, substantially as specified.

2. The combination of a series of horizontal hollow cylinders, a series of longitudinal conveyers in the bottoms thereof, means, substantially as described, for producing air-currents in the direction opposite to the course of the material, a conveyer, G, receiving from the series of conveyers $b$ through suitable spouts, and elevators C and conveyers D for returning the material to be re-treated, substantially as set forth.

In testimony whereof I affix my signature in presence of two witnesses.

SIGMUND SPITZER.

Witnesses:
T. C. BRECHT,
LOUIS BEYER.